(12) United States Patent
Lösch

(10) Patent No.: US 6,545,259 B2
(45) Date of Patent: Apr. 8, 2003

(54) OPTICAL WAVELENGTH MONITOR FOR A PASSIVE OPTICAL COMPONENT

(75) Inventor: Kurt Lösch, Stuttgart (DE)

(73) Assignee: Alcatel, Paris (FR)

( * ) Notice: Subject to any disclaimer, the term of this patent is extended or adjusted under 35 U.S.C. 154(b) by 7 days.

(21) Appl. No.: 09/973,725

(22) Filed: Oct. 11, 2001

(65) Prior Publication Data

US 2002/0043617 A1 Apr. 18, 2002

(30) Foreign Application Priority Data

Oct. 13, 2000 (DE) .......................... 100 50 973

(51) Int. Cl.[7] .................. G01J 1/34; G01N 21/25; G02B 6/28
(52) U.S. Cl. .................. 250/227.21; 250/227.23; 385/24
(58) Field of Search .................. 250/226, 227.18, 250/227.21, 227.23, 227.24, 227.27; 359/337.11, 341.41, 341.42, 124–134, 177–179; 385/22, 24

(56) References Cited

U.S. PATENT DOCUMENTS 5,777,763 A    7/1998   Tomlison, III

Primary Examiner—David Porta
Assistant Examiner—David C Meyer
(74) Attorney, Agent, or Firm—Sughrue Mion, PLLC

(57) ABSTRACT

An optical wavelength monitor provided with an optical coupler for coupling at least a part of the optical signals transmitted in an optical waveguide, which signals are transmitted by means of different carrier wavelengths divided into channels. The coupler is connected via an optical amplifier to a wavelength demultiplexer which selects at least one carrier wavelength of these optical signals and forwards each of these selected carrier wavelengths to a specific output. Optical detectors are connected to these outputs, which detectors each convert an optical signal, detected in a specific channel, into an electrical signal. The optical wavelength monitor is wherein an oscillator is provided which is suitable for modulating the optical signals, supplied to the optical amplifier, with a frequency.

14 Claims, 6 Drawing Sheets

OPTICAL WAVELENGTH MONITOR FOR A PASSIVE OPTICAL COMPONENT

TECHNICAL FIELD

The invention relates to an optical wavelength monitor and for a method for investigating optical signals. The invention is based on a priority application DE 100 50 973.8 which is hereby incorporated by reference.

BACKGROUND OF THE INVENTION

With the constant demand for transmission capacity in the telecommunications sector (mainly due to the popularisation of the internet) great hopes are placed on the use of frequency division multiplex. Since glass fibres, as are used for the transmission of optical signals, are sufficiently transparent for an extended spectral range, a better utilization rate is achieved if optical frequency division multiplex (OFDM) or wavelength division multiplex (WLDM) is used. Here a number of modulated optical carriers whose frequencies differ are transmitted simultaneously in an optical waveguide (generally glass fibre). This facilitates a considerable increase in the maximum quantity of optical signals transmitted in already existing optical cables without the need to install new cables.

In parallel to this development there has been a constant increase in the number of carrier frequencies employed which can currently amount to more than 250 for one single glass fibre. As such a large number of carrier frequencies inevitably causes the distances between channels defined by the relevant carrier frequencies to be selected to be ever smaller, it is essential to be able to employ a means of monitoring the optical signals transmitted by the carrier frequencies in the course of the transmission links. In general the channels are arranged in a fixed grating, for example in accordance with a standard defined by the ITU in which the distances between adjacent channels, either in terms of wavelength or frequency, are equal. Therefore it is very important that for example a shift or disturbance of some carrier frequencies in their respective channels along the transmission link should be ascertained as early as possible for their optional correction.

U.S. Pat. No. 5,777,763 has disclosed an optical module with which optical signals transmitted in an optical fibre can be investigated along the latter. In particular this optical module can be used to compare the individual carrier wavelengths (inversely proportional to the carrier frequencies) in the respective channels of the transmitted optical signals with reference wavelengths. The optical module basically consists of a central waveguide grating and two planar lenses, one for the input, the other for the output. This optical module is directly inserted into the transmission link to be investigated. An optical input fibre is coupled to the input lens. Similarly the output lens is coupled to an optical output fibre. With the aid of the waveguide grating it is possible to investigate individual carrier wavelengths with which optical signals are transmitted by positioning detectors at specific points of this optical module in order to measure backscattered light in specific channels. It is provided that two detectors be connected for each channel to be investigated. In this way it is possible to measure both the amplitude of the power level in the investigated channels as well as a wavelength shift of the carrier wavelength. The results of such measurements are then used to optionally control the transmitted optical signals by means of feedback. This therefore provides a possibility of being able to correct excessively high attenuations or wavelength shifts.

This optical module according to U.S. Pat. No. 5,777,763 involves the considerable disadvantage of being directly connected to the transmission link. The optical fibre serving as transmission link is thereby interrupted in order to be able to introduce the optical module. There is a substantially increased risk of the transmitted optical signals being negatively influenced by the insertion of a defective optical module.

It is already prior art for similar optical modules for investigating power levels and/or wavelength shifts of transmitted optical signals not to be inserted directly into the transmission link but to be connected to the transmission link with the aid of a coupler (tap coupler), generally a directional coupler, or optionally a splitter. This has the advantage that the transmitted optical signals are not directly influenced. However, this technique has the disadvantage of the too small portion of split-off transmitted optical signals, which considerably impedes the satisfactory investigation of the optical signals.

SUMMARY OF THE INVENTION

The object of the invention is to design an optical wavelength monitor with which it is possible to perform very reliable measurements of power levels and/or wavelength shifts of carrier wavelengths in different channels of transmitted optical signals, without too greatly influencing the respective transmitted optical signals.

This object is achieved in accordance with the invention by means of an optical wavelength monitor with an optical coupler for coupling at least a part of the optical signals transmitted in an optical waveguide, which signals are transmitted by means of different carrier wavelengths divided into channels, wherein the coupler is connected via an optical amplifier to a wavelength demultiplexer which selects at least one carrier wavelength and forwards the selected carrier wavelengths to specific outputs to which optical detectors are connected, which each convert an optical signal, detected in a specific channel, into an electrical signal, wherein an oscillator is provided which is suitable for modulating the optical signals, supplied to the optical amplifier, with a frequency.

In accordance with another embodiment of the invention, its object is achieved by a method for investigating optical signals which are transmitted in an optical waveguide and consist of different carrier wavelengths divided into channels, wherein at least one property of these optical signals is measured with the aid of the optical wavelength monitor and is compared with pre-stored calibration values.

The use of an oscillator for methoding the small extracted portion of transmitted optical signals in accordance with the lock-in principle enables these optical signals to be satisfactorily investigated via a coupler. With this construction according to the invention it is also possible to utilize the advantages of the use of a coupler, i.e. the possibility of very minor influence of the transmitted optical signals, without being too limited by the poor ratio of the coupled optical signals relative to the noise. The modulation of the coupled optical signals, advantageously between two values, offers a considerably higher degree of stability of monitoring measurements performed on these optical signals. Additionally the sensitivity of such monitoring measurements is considerably better. The use of an optical wavelength monitor of this type offers the possibility of optionally simultaneously investigating individual or all of the channels used. Furthermore, advantageously it is possible to select between different options for the investigation of the optical signals by differently setting the reference wavelength of the detectors using a controllable temperature source for example. An optical wavelength monitor of this kind facilitates selective measurements of power levels of optical signals or of noise or also of wavelength shifts of these optical signals in specific channels, without the need for different constructions for this purpose.

Advantageous developments of the invention are described in the dependent claims, the following description and the drawings.

BRIEF DESCRIPTION OF THE DRAWINGS

An exemplary embodiment of the invention will now be explained further with reference to the attached drawings in which.

BEST MODE FOR CARRYING OUT THE INVENTION

Figure 1:
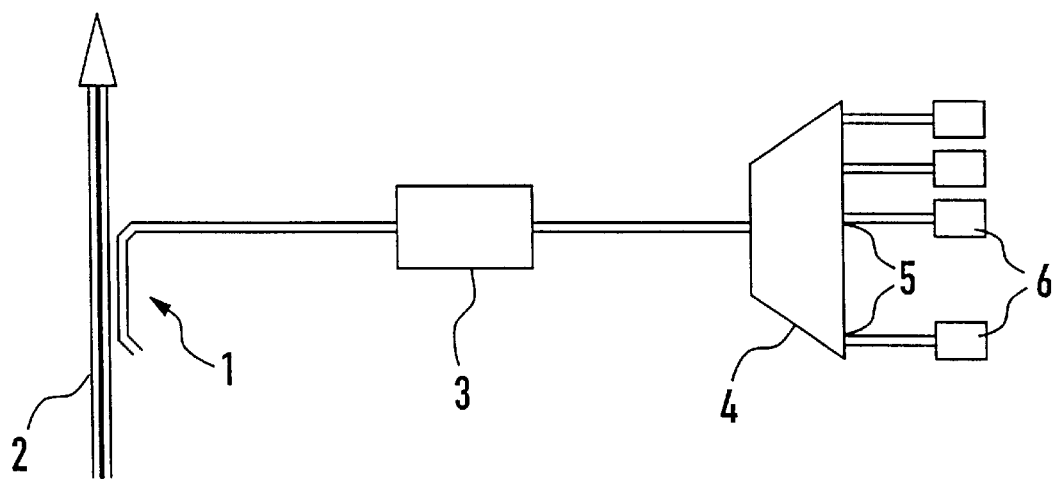
FIG. 1 illustrates an example of an optical wavelength monitor known from the prior art.

FIG. 1 illustrates an example of an optical wavelength monitor as already used in the prior art. Here a coupler 1 is arranged in the direct vicinity of an optical waveguide 2 in which optical signals are transmitted. In the coupler 1 at least in part optical signals are coupled out of the optical waveguide 2, for example less than 5%, and are forwarded to a wavelength demultiplexer 4 (phased array, PHASAR). An optical amplifier 3 is arranged along the path from the coupler 1 to the wavelength demultiplexer 4. This amplifier, which normally consists of a semiconductor optical amplifier (SOA) or erbium-doped fibre amplifier (EDFA), amplifies the coupled optical signals. Optical detectors 6 are connected to the outputs 5 of the wavelength demultiplexer 4. These optical detectors 6 serve to investigate that portion of the optical signals transmitted in the optical waveguide 2 which is coupled by the coupler 1. Either one or two detectors 6 are provided for each channel of the optical signals.

Figure 2:
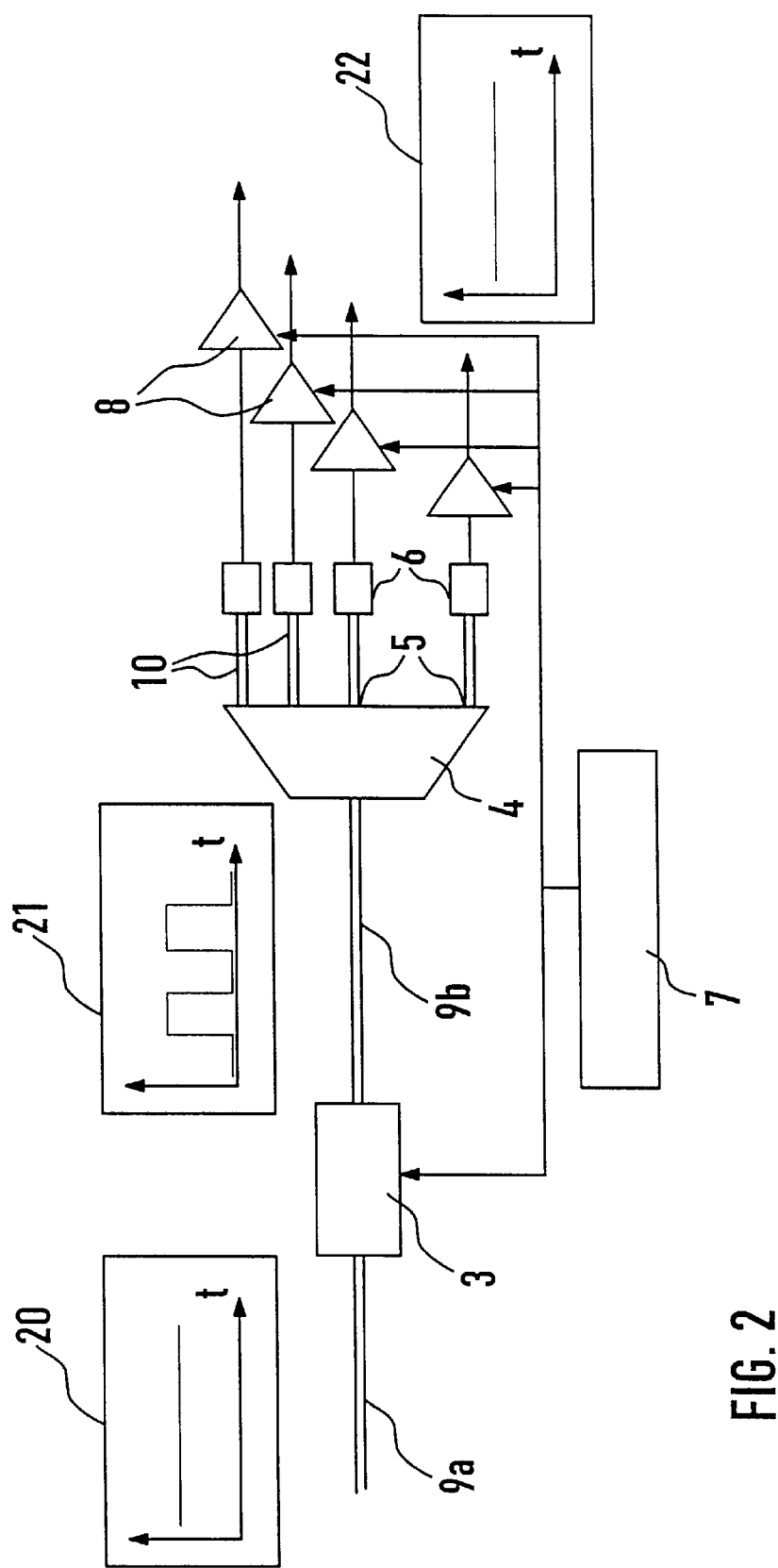
FIG. 2 illustrates an optical wavelength monitor according to the invention with the required oscillator.

An optical wavelength monitor according to the invention is illustrated in FIG. 2. Similarly to the optical wavelength monitor shown in FIG. 1, it is connected via a coupler 1, not shown in FIG. 2, to an optical waveguide 2 in which optical signals are transmitted. The optical signals coupled by the coupler 1 are fed via an optical waveguide 9a to the optical amplifier 3 whereupon they pass via an optical waveguide 9b to the wavelength demultiplexer 4. The optical detectors 6 are connected via optical waveguides 10 to the outputs 5 of this wavelength demultiplexer 4.

The optical wavelength monitor according to the invention additionally comprises an oscillator 7. This oscillator 7 is suitable for providing that the optical signals fed to the optical amplifier 3, i.e. the portion of the transmitted optical signals coupled out of the optical waveguide 2 (see FIG. 1), are modulated with a frequency. The oscillator 7 and the optical amplifier 3 thus operate in the manner of a lock-in amplifier.

Advantageously the amplifier 3 can be modulated between two values in accordance with the chopper principle. Here, in the optical amplifier 3, the optical signals oscillate between a minimum value, which corresponds to the absorption value, and a maximum value which corresponds to the amplified value. A continuous optical signal 20, which is transmitted via the optical waveguide 9a to the input of the optical amplifier 3, will reach the wavelength demultiplexer 4 via the optical waveguide 9b in a form shown in FIG. 2 by the reference 21. The detectors 6, which are connected via optical waveguides 10 to the outputs 5 of the wavelength demultiplexer 4, will be able to perform measurements of carrier wavelengths in the respective channels, with the considerable advantage that it is possible to distinctly differentiate between the one minimum value and the other maximum value. All the problems which occur with d.c. current, such as for example a change as a function of the environmental temperature (drift), are thus avoided.

A rectifier amplifier 8 is connected to each of the optical detectors 6 for methoding the signals electrically converted by the optical amplifier 6. These rectifier amplifiers 8 are optically controlled by the oscillator 7 as shown in FIG. 2. In this case the oscillator 7 will control the respective rectifier amplifier 8 with the same frequency as in the case of the optical amplifier 3. The electrical signals in the respective rectifier amplifier 8 are either added or subtracted in order to obtain a characteristic d.c. current 22 for the respective channels of the optical signals at the output of the rectifier amplifier 8. These d.c. currents 22 can then be used to effect a feedback in respect of the optical signals transmitted in the optical waveguide 2.

Figure 3A:
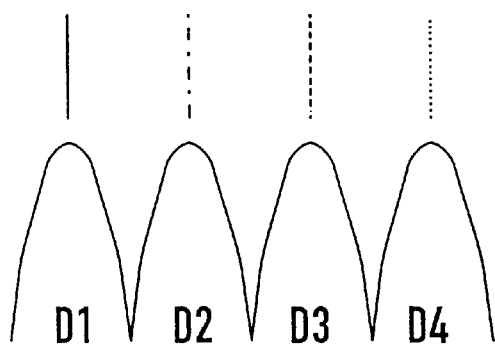
FIGS. 3a to 3c illustrate response curves of the detectors of the optical wavelength monitor according to FIG. 2 in three different operating states.
Figure 3B:
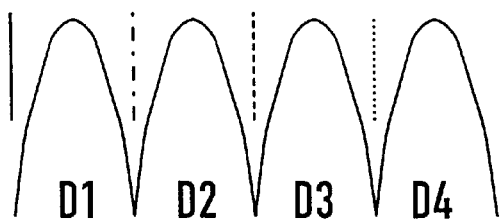
Figure 3C:
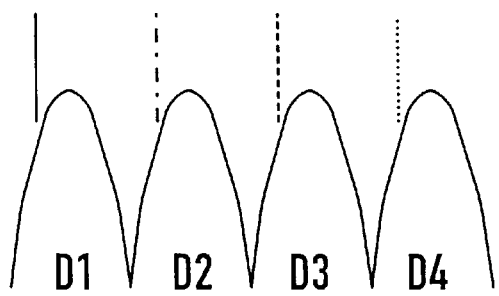

FIGS. 3a to 3c illustrate response curves of four of the optical detectors 6 for three different operating states. One detector per channel is provided, and the four detectors measure optical signals in adjacent channels. The three different operating states differ in that the reference wavelengths of the respective channels, in each case shown by a vertical line in FIGS. 3a to 3c, are coordinated with different positions of the response curves. In FIG. 3a the reference wavelength is centred on the maxima of the response curves. In this case the detectors can be used to measure a variation of the amplitudes of the carrier wavelengths, for example as a function of time. In FIG. 3b the reference wavelengths correspond to the minima of the response curves. In this way it is possible to measure the amplitude of the noise in or between the respective channels. In FIG. 3c the reference wavelengths are in each case coordinated with an inflection point of the response curves. This permits the measurement either of a wavelength shift of the carrier wavelength or a change in its amplitude.

Figure 4A:
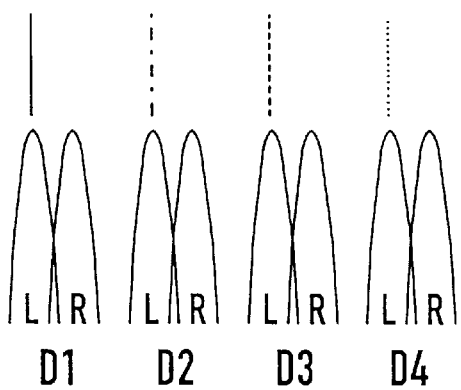
FIGS. 4a to 4c illustrate response curves of the detectors of the optical wavelength monitor according to FIG. 2 in the event that two detectors are used for each channel, in three different operating states.
Figure 4B:
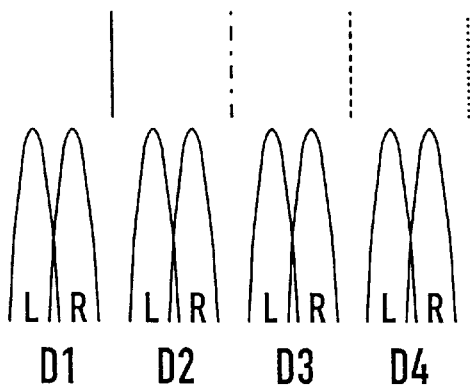
Figure 4C:
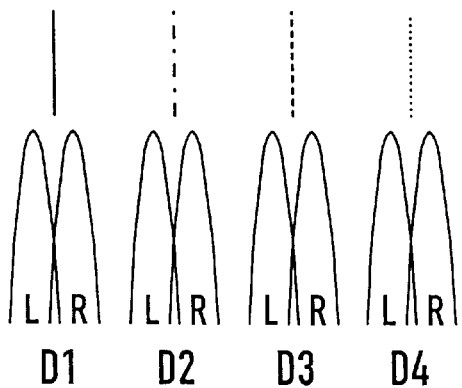

FIGS. 4a to 4c illustrate similar response curves of optical detectors 6, this time using two detectors 6 for each channel. The respective two detectors per channel are connected to outputs 5 of the wavelength demultiplexer 4 such that their response curves are mutually offset and possess a common overlapping zone. Similarly as in FIG. 3a, in FIG. 4a the reference wavelengths of the respective channels are coordinated with the maxima of these response curves to facilitate a measurement of the amplitude of the carrier wavelength. As in FIG. 3b, in FIG. 4b the reference wavelengths correspond to the areas between the non-overlapping zones of the response curves in order to facilitate noise measurements.

In FIG. 4c the respective intersection points of two overlapping response curves in a channel are centred on the respective reference wavelength of this channel. With the aid of this operating state it is possible not only to determine a wavelength shift of the carrier wavelength of a channel relative to the associated reference wavelength, but at the same time also to determine the direction in which this change has occurred. It is thus possible to distinguish whether the carrier wavelength has shifted in the direction of higher or lower wavelengths.

Figure 5A:
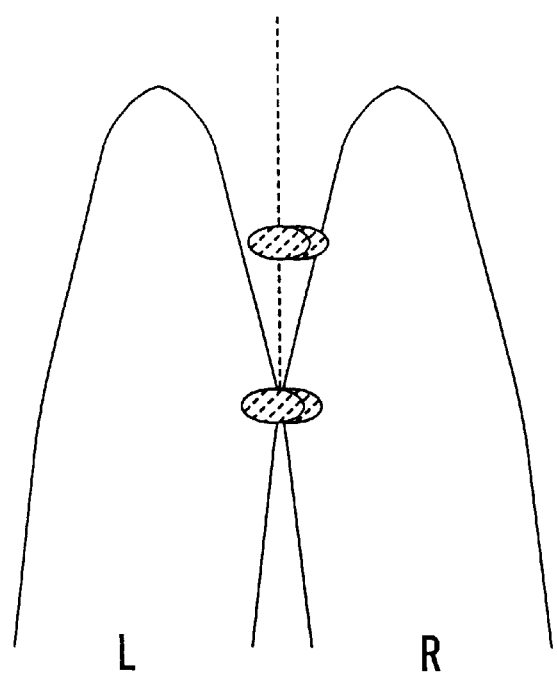
FIGS. 5a to 5c illustrate response curves of two detectors of an optical wavelength monitor according to FIG. 2 for one single channel in the case of three different carrier wavelengths.
Figure 5B:
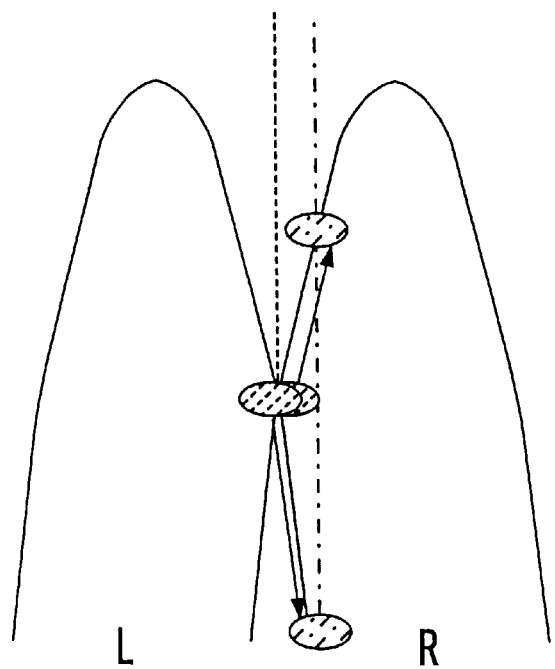
Figure 5C:
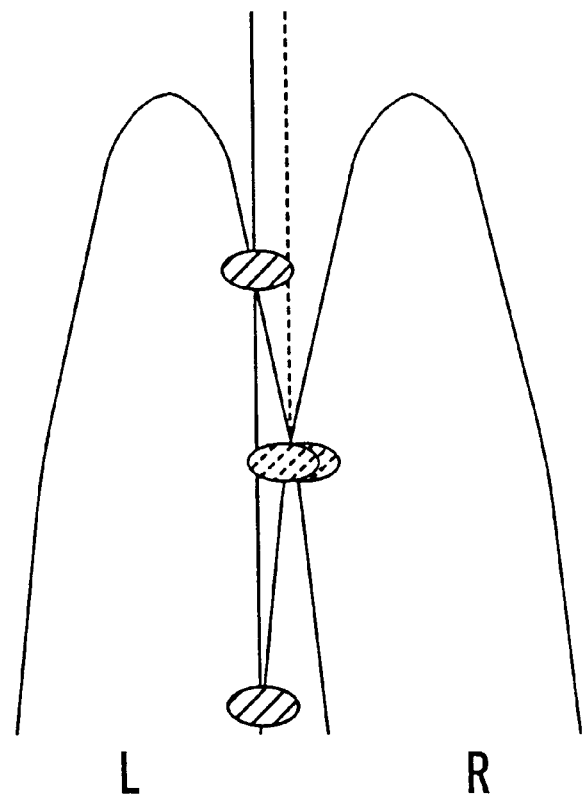

FIGS. 5a to 5c provide a more exact depiction of operating states for a channel according to FIG. 4c. The overlapping response curves of the two detectors are adapted such that their intersection point corresponds to the reference wavelength of the associated channel. FIG. 5a illustrates the case in which the carrier wavelength has not shifted, i.e. corresponds to the reference wavelength.

FIG. 5b illustrates the situation in which the carrier wavelength has shifted to a higher wavelength. This is known as a red shift. This can be clearly determined by the value of the response curve of the one detector L at the carrier wavelength, which is smaller than the value of the response curve of the other detector R for the same carrier wavelength.

FIG. 5c illustrates the other situation in which the carrier wavelength has shifted towards smaller wavelengths. This is known as a blue shift. In contrast to the red shift, this time the value of the response curve of the one optical detector L for the carrier wavelength is larger than the value of the response curve of the other detector R for the same carrier wavelength. Therefore it is possible to clearly differentiate between a red shift and a blue shift, and thus to determine the direction of a wavelength shift of the carrier wavelength relative to the reference wavelength in this channel.

In the investigation of one single channel or a plurality of channels of the optical signals, it is possible to select between different operating states. The selection can be made, in accordance with the invention, with the aid of an adapting device, such as for example a pressure- or bending device. In this context it can be advantageous to use an adapting device in the form of a regulatable heat source which is connected to the wavelength monitor. This heat source can consist of an electric heating element or a Peltier cooler with temperature sensor and downstream regulator. Via this regulator, the temperature of the optical wavelength monitor is then stabilised at a pre-selectable value. Different embodiments of the heat source exist, such at for example a thick film on ceramic or heating foil which has a good thermally conductive connection to the carrier of the optical wavelength monitor (chip). However the heat source can also be directly implemented on the carrier, for example as a thin-film heater as used in thermo-optical components.

The selection of the temperature of the optical wavelength monitor serves to determine the operating state of the detectors. The change in temperature directly influences properties of the wavelength demultiplexer 4. This causes the response curves of the respective optical detectors 6 to shift in a controlled manner relative to those reference wavelengths of the respective channels which have been selected for determination.

Calibration values of reference wavelengths can be determined by means of calibration measurements, which for example use a laser which transmits optical signals for well defined wavelengths which are measured by the wavelength monitor according to the invention. The defined wavelengths are selected such that they correspond to the carrier wavelengths which are subsequently to be monitored. Such calibration measurements are performed at different temperatures and for each wavelength monitor to be used. These calibration values are then stored and serve as reference wavelength for different operating states of the wavelength monitor.

The use of an oscillator for that portion of the optical signals transmitted in the optical waveguide 2 which is coupled by the coupler 1 of the wavelength monitor according to the invention facilitates an unequivocal determination of the properties of these optical signals. The higher signal-to-noise ratio provides for more stable measurement.

Accordingly it is possible for optical signals transmitted in optical waveguides to be investigated in trouble-free manner. This is particularly advantageous in cases in which optical signals are transmitted over long links. Wavelength monitors according to the invention can thus be used virtually arbitrarily on such links. And measurements of this kind can then be used optionally to effect a feedback in respect of the investigated optical signals.

What is claimed is:

1. An optical wavelength monitor with an optical coupler for coupling at least a part of the optical signals transmitted in an optical waveguide, which signals are transmitted by means of different carrier wavelengths divided into channels, wherein the coupler is connected via an optical amplifier to a wavelength demultiplexer which selects at least one carrier wavelength and forwards the selected carrier wavelengths to specific outputs to which optical detectors are connected, which each convert an optical signal, detected in a specific channel, into an electrical signal, wherein an oscillator is provided which is suitable for modulating the optical signals, supplied to the optical amplifier, with a frequency.

2. An optical wavelength monitor according to claim 1, wherein the respective detectors are each connected to a rectifier amplifier via which the respective converted electrical signal is forwarded, each rectifier amplifier being controlled by the oscillator.

3. An optical wavelength monitor according to claim 1, wherein in the optical amplifier the optical signals are modulated in accordance with the chopper principle in which the signals oscillate between a minimum value which corresponds to the absorption value and a maximum value which corresponds to the amplified value.

4. An optical wavelength monitor according to claim 1, wherein in each case two optical detectors for each channel to be investigated are connected to the outputs of the wavelength demultiplexer, where the response curves of the respective two optical detectors are mutually offset and possess a common overlap zone.

5. An optical wavelength monitor according to claim 4, wherein the intersection point of two overlapping response curves is centred on the carrier wavelength of the channel to be investigated.

6. An optical wavelength monitor according to claim 1, wherein it comprises an adapting device for adapting the response curves of the optical detectors and for calibrating said optical detectors.

7. A method for investigating optical signals which are transmitted in an optical waveguide and consist of different carrier wavelengths divided into channels, wherein at least one property of these optical signals is measured with the aid of an optical wavelength monitor according to claim 1 and is compared with pre-stored calibration values.

8. A method for investigating optical signals according to claim 7, wherein one property relates to an extreme value of the amplitude of the power level of the optical signals in the channels to be investigated.

9. A method for investigating optical signals according to claim 7, wherein one property relates to a change in the amplitude of the power level of the optical signals in the channels to be investigated.

10. A method for investigating optical signals according to claim 9, wherein the response curves of the detectors are in each case adapted to an inflection point.

11. A method for investigating optical signals which are transmitted in an optical waveguide and consist of different carrier wavelengths divided into channels, wherein at least one property of these optical signals is measured with the aid of two optical detectors according to claim 4 and is compared with pre-stored calibration values, wherein said one property relates to a shift of the carrier wavelength in the channels to be investigated.

12. A method for investigating optical signals according to claim 7, wherein by regulation of the temperature of the optical wavelength monitor by means of a heat source, the response curves of the respective optical detectors are adapted by a reference wavelength, defined for each channel, as a function of the properties to be measured.

13. A method for investigating optical signals according to claim 7, wherein these pre-stored calibration values are determined by measurements performed on this optical wavelength monitor using an adjustable laser.

14. A method for investigating optical signals according to claim 7, wherein results of these comparisons are used for monitoring at least parts of the optical signals transmitted in the optical waveguide.

* * * * *